United States Patent [19]

Danial

[11] Patent Number: 4,772,035
[45] Date of Patent: Sep. 20, 1988

[54] WHEELED CARRIER FOR PACKAGES

[76] Inventor: Jeffrey Danial, 2170 Rte. 106, Muttontown, N.Y. 11791

[21] Appl. No.: 51,906

[22] Filed: May 19, 1987

[51] Int. Cl.[4] ................................................ B62B 3/02
[52] U.S. Cl. .................................. 280/47.3; 280/47.32
[58] Field of Search .............. 280/79.1, 47.3, 47.13 R, 280/35, 47.32; 16/DIG. 13

[56] References Cited

U.S. PATENT DOCUMENTS

| | | | |
|---|---|---|---|
| 722,569 | 3/1903 | Dilger | 280/47.3 |
| 785,029 | 3/1905 | Vore | 280/47.3 |
| 2,375,338 | 5/1945 | Alexander | 280/47.13 R |
| 2,509,575 | 5/1950 | Mingo | 280/47.13 R X |
| 2,670,969 | 3/1954 | Costikyan | 280/47.13 R |
| 2,696,990 | 12/1954 | Davis | 280/47.13 R |
| 2,845,155 | 7/1958 | Sneyd-Kynnersley | 190/57 |
| 3,744,601 | 7/1973 | Doppelt | 16/DIG. 13 X |
| 3,861,703 | 1/1975 | Gould | 280/47.13 R |
| 3,889,965 | 6/1975 | Zeitlin | 280/47.13 R |

FOREIGN PATENT DOCUMENTS

| | | |
|---|---|---|
| 552495 | 2/1958 | Canada . |
| 1065405 | 5/1954 | France . |
| 501767 | 11/1954 | Italy . |
| 615323 | 1/1961 | Italy . |
| 352577 | 4/1961 | Switzerland . |

Primary Examiner—John J. Love
Assistant Examiner—Michael Mar
Attorney, Agent, or Firm—Frishauf, Holtz, Goodman & Woodward

[57] ABSTRACT

A wheeled carrier arrangement which is readily and securely attachable to packaging such as is used for bulky consumer items. The wheeled carrier is provided with walls to engage adjoining sides of the package. Pins and/or an adhesive layer are added to the wheeled carrier walls for engagement with the package. The pins are arranged to puncture the packaging which is typically made of cardboard. At least one wheel extends outward so that it can support the package when the item is tilted onto it.

20 Claims, 2 Drawing Sheets

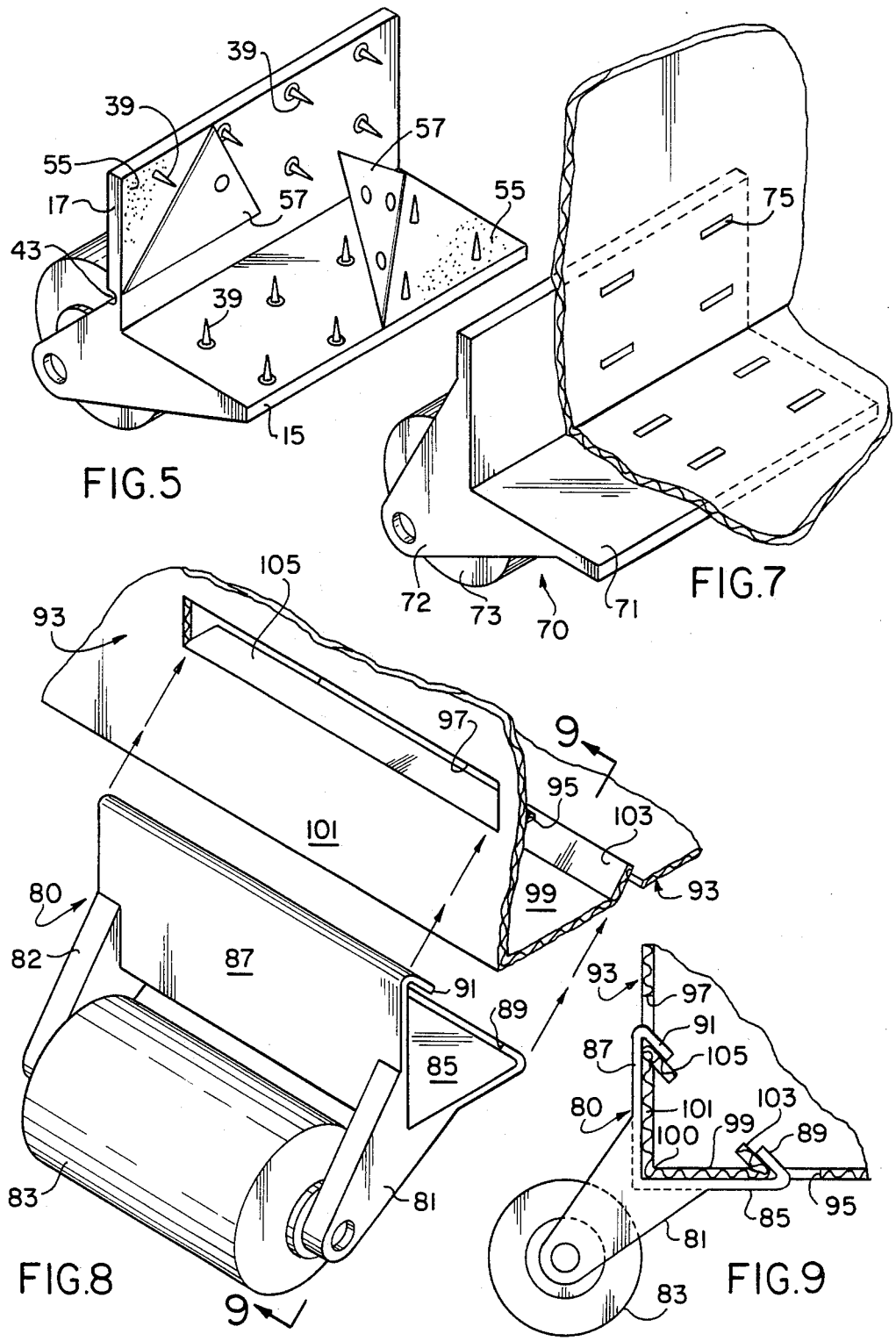

WHEELED CARRIER FOR PACKAGES

BACKGROUND OF THE INVENTION

This invention relates to a wheeled carrier for attachment to packages and, more particularly, to a roller which is readily attachable to large, bulky and heavy packages, such as of the cardboard box type, which is itself directly securable to the package in addition to, or as an alternative to, securing the roller to the package by means of a string or strap extending around the package.

Many wheeled carriers for luggage and other parcels are known. Some involve a permanent attachment of the wheeled carrier to the luggage or parcel. Others disclose an arrangement for removably attaching the wheeled carrier to the package. The permanent form of attachment, for example as used on luggage, has many disadvantages in that, for example, the wheels project from the luggage and can become damaged or cause damage to other luggage. Furthermore, a permanently attached wheel arrangement can be relatively expensive to manufacture, and it is also expensive to repair. The other type of prior art wheeled carrier which can be removed from the luggage also has several disadvantages. For example, such approaches involve a combination of straps, wheels, holding plates, buckles, etc. which, especially when removed, form a clumsy package which must be folded, stored, carried, and applied. In addition, some of these approaches require the use of special tools. Furthermore, all the various components can together be relatively costly. In addition, although some of these approaches secure the wheeled carrier by means of a strap, some slippage and possibly accidental detachment of the wheeled carrier from the luggage might, nevertheless, occur. Examples of removable wheeled carriers can be found in U.S. Pat. Nos. 2,670,969, 2,6956,990, 2,845,115, and 3,889,965.

SUMMARY OF THE INVENTION

The primary object of the present invention is to provide a simple, inexpensive, easy-to-use wheeled carrier for packages, such as large boxes, which are ordinarily received by a purchaser when purchasing large items from retail stores.

A further object of the present invention is to provide such a wheeled carrier which is so inexpensive as to be a disposable device which may be given by a retail store to a customer at substantially no charge, and which may then be discarded by the customer after use.

Another object of the present invention is to provide a wheeled carrier which includes means for securely attaching itself to a package in addition to, or possibly as an alternative to, a string or strap wrapped around the package.

Still another object of the present invention is to provide a wheeled carrier readily attachable to a package without the need for specialized tools.

Yet another object of the present invention is to provide a wheeled carrier which is light, compact, and storable in large quantities in a relatively small space.

A still further object of the present invention is to provide a wheeled carrier utilizing a minimum number of parts.

These and other objects of the present invention are attained by a wheeled carrier for packages comprising a support adapted to be positioned at a corner of a package. This support has a first support surface and a second support surface adapted to, respectively, engage adjoining walls of the package. At least one wheel is rotatingly coupled to the support so as to extend away from the package. Means is provided on at least one of the first and second support surfaces for securing the wheeled carrier to the package.

BRIEF DESCRIPTION OF THE DRAWINGS

FIG. 5 is a perspective view of a third embodiment of the present invention showing the use of the combination of piercing means and adhesive means.

FIG. 7 is a perspective view of a fifth embodiment of the present invention which provides means for stapling the wheeled carrier to the package.

FIG. 8 is a perspective view of a sixth embodiment of the present invention illustrating means which can be snap fit onto a package.

FIG. 9 is a side elevational view taken in cross section along line 9—9 of FIG. 8.

DETAILED DESCRIPTION OF THE INVENTION

Many items are purchased by consumers in large, heavy boxes which are difficult to carry because of their weight and/or bulk. It would be much more convenient for such boxes to be wheeled along the ground on a carrier which would bear the weight of the package and which would make it easier to guide the package along. Although a store might provide a dolly for such a purpose within or just outside the store, the consumer is on his own if his automobile is far from the store. Also, some consumers may have a considerable distance to traverse between a parking spot and their home. It is highly desirable, for the store, to eliminate the need for expensive personnel needed to assist the customers in transporting such purchased items while, at the same time, maintaining good will by assisting the consumer in transporting the purchased merchandise from store to automobile and from automobile into the home.

Figure 1:
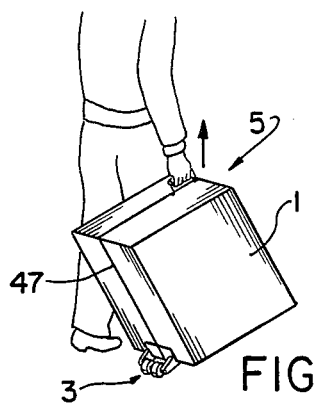
FIG. 1 is a perspective view showing one embodiment of the wheeled carrier of the present invention secured to a box.

FIG. 1 shows an example of how a wheeled carrier might be used. Box 1 might contain, for example, a television set, a video tape recorder, stereo equipment, a microwave oven and the like. A wheeled carrier 3 is attached to a bottom corner of box 1 while a handle 5 is provided at the diagonally opposite upper corner of box 1. Because box 1 is relatively narrow, only one wheeled carrier 3 is needed. The consumer tilts box 1 by lifting handle 5 so that most of the weight of the box rests on wheeled carrier 3. Box 1 can then be wheeled along by pulling it with handle 5 while maintaining box 1 tilted. Wheeled carrier 3 depicted in FIG. 1 will be discussed in greater detail with respect to FIGS. 2 and 3.

Figure 1A:
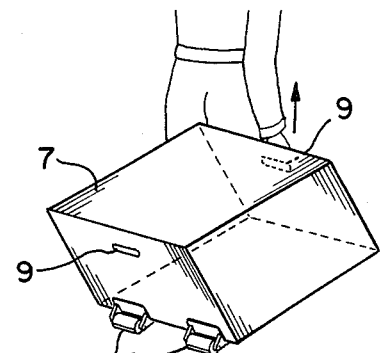
FIG. 1A is a perspective view showing another embodiment of the wheeled carrier of the present invention secured to another type of box from that shown in FIG. 1.

Another example for using a wheeled carrier is depicted in FIG. 1A showing box 7 having knocked-out handle holes 9. Because box 7 is relatively wide, two wheeled carriers 11 are used. These are attached to a bottom corner of box 7 diagonally opposite from one of the knocked-out handle holes 9. Wheeled carrier 11 can be, for example, that discussed below in greater detail with respect to FIGS. 8 and 9. Box 7 of FIG. 1A is transported by tilting it upward and pulling it along by one of knocked-out handles 9, as shown in FIG. 1A.

Figures 2, 3:
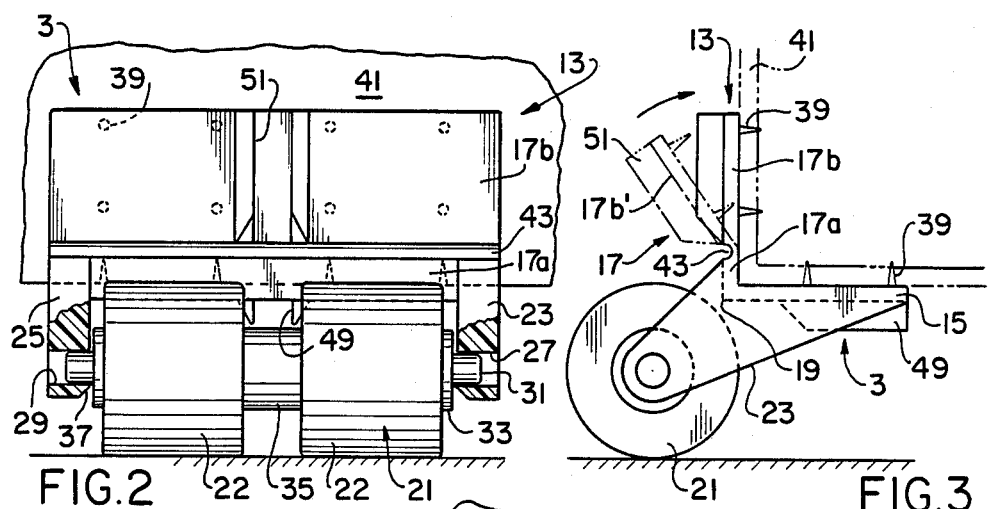
FIG. 2 is an elevational front view of a first embodiment of the present invention having pins or projections for securing itself to the package by piercing the package walls.
FIG. 3 is a side view of the first embodiment of the wheeled carrier shown in FIG. 2.

Turning now with specificity to the details of the present invention, FIGS. 2 and 3 depict the first embodiment. Wheeled carrier 3 comprises a support 13 having a bottom portion 15 and a side portion 17. Bottom portion 15 meets side portion 17 at corner 19. The thickness of bottom portion 15 and side portion 17 is reduced at corner 19 to provide adequate clearance for roller 21. Legs 23 and 25 project from support 13 and are connected to both bottom portion 15 and side portion 13 to contribute added rigidity to the overall assembly. Roller 21, as best shown in FIG. 2, is rotatably journaled into bearings 27 and 29 by shaft 31. Shoulders 33 at either end of roller 21 act as a washer. Roller 21 comprises two wheel-like members 22 with a central reduced diameter portion 35 therebetween. Legs 23 and 25 are provided with a lower chamfer 37 to serve as a lead-in surface to facilitate the insertion of shaft 31 into bearings 27 and 29 during assembly by the application of pressure to force roller 21 into the position shown in FIG. 2.

In accordance with a salient feature of this first embodiment shown in FIGS. 2 and 3, support 13 is provided with sharp piercing projections, or pins, 39 which are designed to pierce through the wall 41 of the package, as best shown in FIG. 3. The package is typically made out of corrugated cardboard which can be pierced relatively easily. In order to facilitate the installation of wheeled carrier 3 in this manner onto the package, side wall 17 is provided with a hinge notch 43 which vertically divides side wall 17 into a fixed lower portion 17a (without pins or projections 39 thereon) and a movable upper portion 17b (having pins or projections 39 thereon). Side wall portion 17b is tilted to the position 17b' shown in FIG. 3 by dotted lines. Bottom wall 15 can then be positioned in place by pressing side wall portion 17a against package wall 41 and then forcing pins 39 through the bottom of the package without any interference from pins 39 on upper side wall portion 17b. Once bottom wall 15 is in position (shown in FIG. 3), upper side wall portion 17b is forced against wall 41 of the package until pins 39 pierce wall 41 to reach their final position as shown by solid lines in FIG. 3. With this arrangement, pins 39 prevent sideways movement of the wheeled carrier 3 relative to the box to which it is attached. Furthermore, the fact that the projections 39 on bottom wall 15 are at right angles to those on side wall 17 acts to prevent the detachment of wheeled carrier 3 from the package because loosening of side wall 17 is prevented by projections 39 on bottom wall 15, and vice versa. Furthermore, when the package is tilted so that its weight is borne by wheeled carrier 3, the resulting forces act to press wheeled carrier 3 toward the package to further minimize the possibility of detachment. Consequently, wheeled carrier 3 is independently securely attachable to box 1.

With the above description of a firm, independent securing arrangement for wheeled carrier 3 notwithstanding, it may still be advisable in some circumstances to also secure wheeled carrier 3 to box 1 by means of a string or strap 47 (see FIG. 1). To accommodate such a string, bottom wall 15 is provided with a channel formed by projections 49 while side wall 17 is provided with a channel formed by projections 51, as seen in FIGS. 2 and 3. Reduced diameter portion 35 of roller 21 also provides additional room to accommodate string 47. An alternative to providing these channels and portion 35 is to simply lengthen legs 23 and 25 while maintaining the size of roller 21 the same in the horizontal direction (that is, reduced diameter portion 35 is eliminated). However, this results in a bulkier arrangement which is preferably avoided. Consequently, in order to provide for an acceptable size for the wheeled carrier without unduly decreasing the diameter of roller 21 which would hinder its effectiveness, the various above-mentioned channels and reduced diameter portion 35 are advantageously provided. As is readily apparent, string 47 is passed through channel 49, the space between reduced diameter portion 35 of roller 21 and corner 19, channel 51, and then around the remainder of the box. It is tightened to the box and then knotted to more firmly secure the wheeled carrier to the package.

Figures 4, 6:
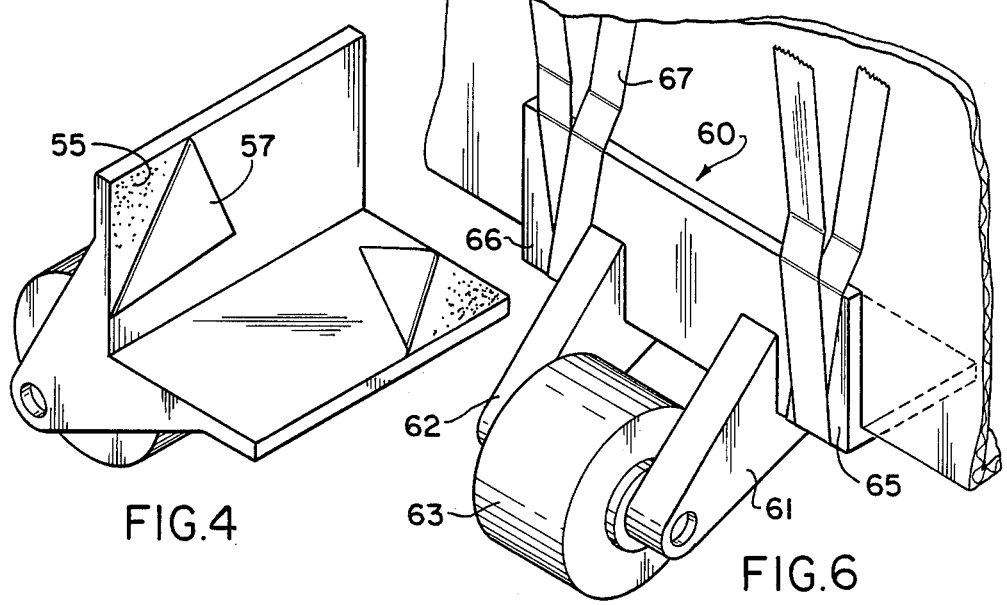
FIG. 4 is a perspective view of a second embodiment of the present invention showing adhesive means for physically adhering the wheeled carrier to a surface of a package.
FIG. 6 is a perspective view of a fourth embodiment of the present invention using a laterally extending surface which can be individually taped to the package.

A second embodiment of the present invention is shown in FIG. 4. It utilizes a similar arrangement to that discussed in detail above with respect to the embodiment of FIGS. 2 and 3. Therefore, those details need not be repeated here. The FIG. 4 embodiment differs from that of the first embodiment in that instead of using pins 39 to affix wheeled carrier 3 to the package, the FIG. 4 embodiment uses an adhesive layer 55 normally covered by a peel-away paper 57. When it is desired to affix the wheeled carrier of FIG. 4 to a package, peel-away paper 57 is removed, and the wheeled carrier is firmly pressed to the package. Adhesive layer 55 can be any well-known type which provides a firm attachment to the package. If, for example, the adhesive layer is of the instant bonding type, then it would be advisable to provide the wheeled carrier of FIG. 4 with a hinge notch 43 such as that disclosed above for the first embodiment of FIGS. 2 and 3. If, however, adhesive layer 55 allows some movement relative to the package after the initial engagement, then such a hinge notch 43 can be dispensed with. In fact, FIG. 4 does not depict such a hinge notch.

FIG. 5 discloses an embodiment which can be said to be a combination of the two embodiments discussed above. The FIG. 5 embodiment includes all the features disclosed above with respect to FIGS. 2 and 3 with the addition of adhesive layer 55 and peel-away paper 57 of the FIG. 4 embodiment. Such a combination of attachment means 39 and 55 even more firmly secures the wheeled carrier to a package. A possible variation of the FIG. 5 embodiment is to provide an adhesive layer on only one of the bottom and side portions 15 and 17, or, alternatively, to provide pins 39 on only one of such portions. Such variations would somewhat reduce the effectiveness of the attachment at a commensurate reduction in cost.

A further variation of the FIG. 5 embodiment is to provide one of surfaces 15 and 17 with pins while adhesive is placed on the other. If an instant bonding type of adhesive is used, then a notch 43 should also be provided. However, a notch 43 need not be used if the adhesive allows some movement after it is initially engaged.

FIG. 6 shows yet another embodiment of the present invention which utilizes a support 60 from which project legs 61 and 62 into which roller 63 is journaled. Roller 63 is relatively narrower than the rollers disclosed above with respect to the previous embodiments. The narrowness of roller 63 permits a portion of support 60 to project laterally beyond legs 61 and 62 without increasing the overall dimensions of the wheeled carrier. Laterally projecting portions 65, 66 can then be utilized for attaching the wheeled carrier to a package by means of adhesive tape 67. Tape 67 can be utilized as the only means of attaching the wheeled carrier to the package, or it can be applied to supplement other attachment means such as pins 39 and/or adhesive layer 55 (not shown in FIG. 6). The FIG. 6 embodiment provides a great deal of flexibility in terms of how strong the attachment can be made for a particular application for the wheeled carrier. For example, if the package is expected to undergo a particularly rugged transport, then tape 67, possibly together with pins 39 and/or adhesive layer 55, will insure that the wheeled carrier does not come loose.

FIG. 7 shows yet another embodiment of the present invention. Wheeled carrier 70 is formed of a support 71 from which legs 72 project and into which roller 73 is journaled as in the previous embodiments. Support 71 is provided with a plurality of openings 75 regularly spaced throughout. Openings 75 are sized and/or spaced to accommodate therein staples or rivets, whichever is preferable for a particular application. For example, if staples are to be used, then openings 75 are spaced from each other so that the staple legs can be admitted therein. Possibly a special tool will be required to cooperate with the staples so that the legs are bent internally of the package for grasping the package. Similarly, the rivets may have to be applied with a special tool. The FIG. 7 wheeled carrier embodiment 70 can also be provided in combination with the other attachment means 39 and 55 discussed in detail above.

A still further embodiment of the present invention is depicted in FIGS. 8 and 9. Specifically, support 80 is provided with legs 81, 82 extending therefrom and into which roller 83 is rotatably journaled. Support 80 includes a bottom portion 85 and a side portion 87, with each being provided with return lips 89 and 91, respectively. Return lips 89, 91 are bent back toward their respective bottom and side portions. Package 93 is provided with slots 95, 97 in bottom wall 99 and side wall 101, respectively. Slots 95, 97 can readily be formed by slitting the package to form flaps 103, 105 which can be folded inward. For example, flap 103 forms slot 95 and flap 105 forms slot 97. Slots 95 and 97 must be accurately positioned, preferably with a die guide. Alternatively, the flaps are pre-cut during manufacture of the package 93. As best shown in FIG. 9, the length of bottom wall 99 of package 93 from corner 100 of the package is slightly longer than the distance between corner 100 and the tip of return lip 89 of the wheeled carrier. Likewise, the distance along wall 101 between corner 100 to slot 97 is slightly longer than the distance between corner 100 and the tip of lip 91. This means that the insertion of return lips 89 and 91 into slots 95 and 97, respectively, will meet with resistance from walls 99 ad 101. However, the relative dimensions are also so selected that continued application of force will result in return lips 89, 91 snapping through slots 95, 97, respectively, and firmly locking in place, as can be seen in FIG. 9.

As can readily been seen from FIG. 9, lateral movement of the wheeled carrier is prevented by the return lips bearing against the side walls of slots 95, 97. Also, loosening of the wheeled carrier from the package is inhibited by the wrap-around of return lips 89, 91 around respective flaps 103, 105. Consequently, a strong and durable arrangement is provided. However, this is not to say that this embodiment must rely only on the just-disclosed attachment means. It can be combined with pins 39 and/or an adhesive arrangement using adhesive layer 55. The pins and/or adhesive layer can be added to either or both of the walls 99 and 101. Also, if pins and/or an adhesive layer are added to both walls 99 and 101, this embodiment could also be provided with a notch 43.

The embodiments of FIGS. 4–9 can each be provided with channels 49, 51 to accommodate a string 47 (FIG. 1) or the like to further secure the wheeled carrier to the package.

Although a number of embodiments has been disclosed in detail above for the present invention, various modifications thereof will readily occur to one with ordinary skill in the art. For example, any of the disclosed embodiments can also be provided with plural wheels either separately or on a common shaft. Also, notch 43 an be provided in bottom wall 15 rather than in side wall 17. In addition, pins 39 can be formed by punching them out of the bottom and/or side wall of the wheeled carrier. Any sturdy, durable, strong material can be used for the wheeled carrier as, for example, metal or plastic. These and other such modifications are all intended to be included within the scope of the present invention as defined by the following claims.

I claim:

1. A wheeled carrier for packages comprising:
a support adapted to be positioned at a corner of a package having adjoining walls which are in respective planes which mutually intersect, said support having a first support surface and a second support surface for respectively engaging said first support surface being adapted to engage a bottom of said package and said second support surface being adapted to engage a sidewall of said package;
at least one wheel rotatingly coupled to said support and adapted to extend away from said package; and
securing means on both of said first and second support surfaces of said support for positively engaging a respective adjoining wall of package for securing the wheeled carrier to said package;
said securing means on each of said first and second support surfaces comprising piercing means projecting toward said package as said first and second support surfaces engage said respective adjoining package walls for piercing and extending at least partly through said respective package wall; one of said first and second support surfaces including first and second portions pivotally connected together by a pivotal connection means for permitting pivotal or rotational movement of said secod portion relative to said first portion at least in a direction away from said package, said first portion extending between said pivotal connection means and the other of said first and second support surfaces of the wheeled carrier, said second portion carrying said piercing means and said first portion being fixedly connected to said other of said support surfaces and being free of securing means.

2. The wheeled carrier of claim 1, wherein a said bottom and sidewall are substantially perpendicular to each other.

3. The wheeled carrier of claim 2, wherein said pivotal connection means comprises a substantially horizontal extending notch means formed in said one of said first and second support surfaces for enabling rotation of said second portion relative to said first portion away from said package.

4. The wheeled carrier of claim 3, wherein said one of the first and second support surfaces is the second support surface.

5. The wheeled carrier of claim 4, further comprising a groove in the first and second support surfaces perpendicular to the corner formed by the bottom and sidewall of the package or accomodating a tying means for securing the wheeled carrier to the package.

6. The wheeled carrier of claim 3, wherein said first portion is free of said piercing means.

7. The wheeled carrier of claim 3, wherein said notch means comprises a living hinge.

8. The wheeled carrier of claim 1, wherein said securing means further comprises adhesive means on at least one of said first and second support surfaces.

9. The wheeled carrier of claim 1, wherein said securing means further comprises an extension of said support projecting laterally on either side of said wheel adapted to engage at least one of said adjoining package walls, and adhesive tape means for attaching the lateral extensions to said package.

10. A wheeled carrier for packages comprising:
a support adapted to be positioned at a corner of a package having adjoining walls which are in respective planes which mutually intersect, said support having a first support surface and a second support surface for respectively engaging said adjoining walls of said package;
at least one wheel rotatingly coupled to said support and adapted to extend away from said package; and
securing means on both of said first and second support surfaces of said support for positively engaging a respective adjoining wall of said package for securing the wheeled carrier to said package;
one of said first and second support surfaces including a first portion and a second portion which is pivotally connected to said first portion for pivotal movement of said second portion relative to said first portion at least in a direction away from the wall of said package to be supported thereby, said first portion being fixedly connected to the other of said first and second support surfaces of the wheeled carrier to form a fixed corner receiving area for receiving a corresponding corner of said package, the securing means of said one of said first and second surfaces being carried only by said pivotable second portion, said first portion being free of said securing means;
whereby after the securing means of said other of said first and second support surfaces is attached to a first respective wall of said package, said second portion of said one of said support surfaces is pivotable toward a second respective adjoining wall of said package for permitting positive engagement of said securing means on said second portion with said second wall of said package.

11. The wheeled carrier of claim 10, wherein said first support surface is adapted to engage a bottom of said package and said second support surface is adapted to engage a sidewall of said package, said bottom and sidewall being substantially perpendicular to each other.

12. The wheeled carrier of claim 11, wherein said one of the first and second support surfaces is the second support surface.

13. The wheeled carrier of claim 12, wherein said pivotal connection between said first and second portions comprises a notch formed in said one of said first and second support surfaces 14. The wheeled carrier of claim 13, wherein said notch comprises a living hinge.

15. The wheeled carrier of claim 10, further comprising a groove in the first and second support surfaces perpendicular to the corner formed by the bottom and sidewall of the package for accommodating a tying means for securing the wheeled carrier to the package.

16. The wheeled carrier of claim 10, wherein said securing means comprises adhesive means on at least one of said first and second support surfaces.

17. The wheeled carrier of claim 10, wherein said securing means comprises piercing means projecting toward said package as said at least one of said first and second support surfaces engages said respective adjoining package walls for piercing said respective package wall.

18. The wheeled carrier of claim 17, wherein said securing means comprises adhesive means on at least one of said first and second support surfaces.

19. The wheeled carrier of claim 11, wherein said securing means comprises piercing means projecting toward said package as said at least one of said first and second support surfaces engages said respective adjoining package walls for piercing said respective package wall.

20. The wheeled carrier of claim 10, wherein said first portion is free of said piercing means.

* * * * *